United States Patent [19]

Fujisawa et al.

[11] 4,455,559
[45] Jun. 19, 1984

[54] PEN RECORDER

[75] Inventors: Kyuichi Fujisawa, Tonan; Mineo Shibata, Tamayama, both of Japan

[73] Assignee: Alps Electric Co., Ltd., Tokyo, Japan

[21] Appl. No.: 433,402

[22] Filed: Oct. 8, 1982

[30] Foreign Application Priority Data

Oct. 12, 1981 [JP] Japan ................................ 56-151247

[51] Int. Cl.³ .............................................. G01D 9/30
[52] U.S. Cl. ................................... 346/139 R; 346/46
[58] Field of Search ..................... 346/141, 139 R, 46, 346/49

[56] References Cited

U.S. PATENT DOCUMENTS 4,274,102  6/1981  Lum ................................. 346/139 R
4,299,031  11/1981 Collins ............................ 346/141 X
4,405,931  9/1983  Fujisawa ......................... 346/139 R Primary Examiner—Joseph W. Hartary
Attorney, Agent, or Firm—Guy W. Shoup; Gerard F. Dunne

[57] ABSTRACT

In a pen recorder for obtaining desired recording data by pushing pen means mounted to a pen holder onto recording paper, the improvement comprising:
(a) a feed mechanism for feeding said recording paper;
(b) a moving pen holder for supporting said pen means; and
(c) hammer means disposed at the rear of said pen means so as to bring the tip of said pen means into contact with said recording paper;
(d) the tip of said pen means being fitted into support holes bored on a leaf spring fixed to said pen holder;
(e) said leaf spring urging said pen means toward said hammer means;
(f) said pen means being detachable relative to said pen holder;
(g) said support hole of said leaf spring being shaped by expanding a part of a round hole in the direction opposite the pen withdrawing direction.

8 Claims, 6 Drawing Figures

PEN RECORDER

BACKGROUND OF THE INVENTION

Field of the Invention

This invention relates to a pen recorder for use in an X-Y recorder, an alpha-numeric printer, and the like.

SUMMARY OF THE INVENTION

The present invention provides a pen recorder having a construction in which a pen tip can easily come out from inside a support hole of a leaf spring that pushes a pen when the pen supported by a pen holder is removed.

DESCRIPTION OF THE PREFERRED EMBODIMENTS

Figure 1:
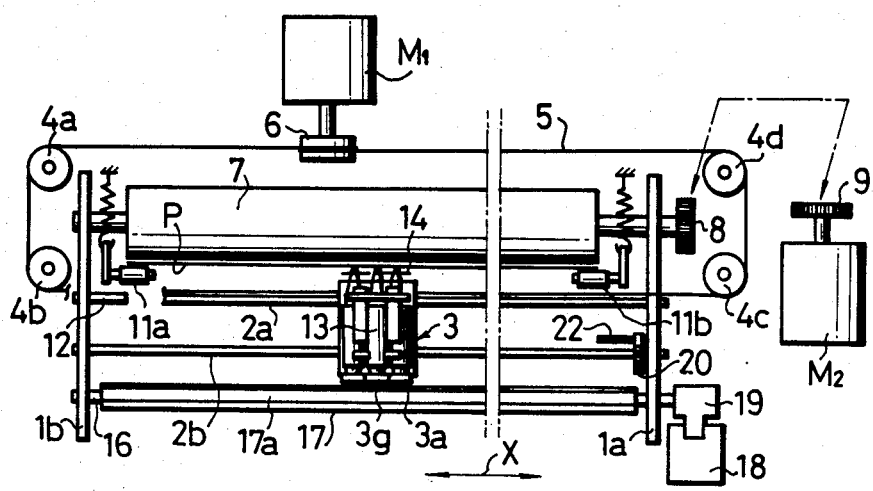
FIG. 1 is a plan view showing the principle of the pen recorder.
Figure 2:
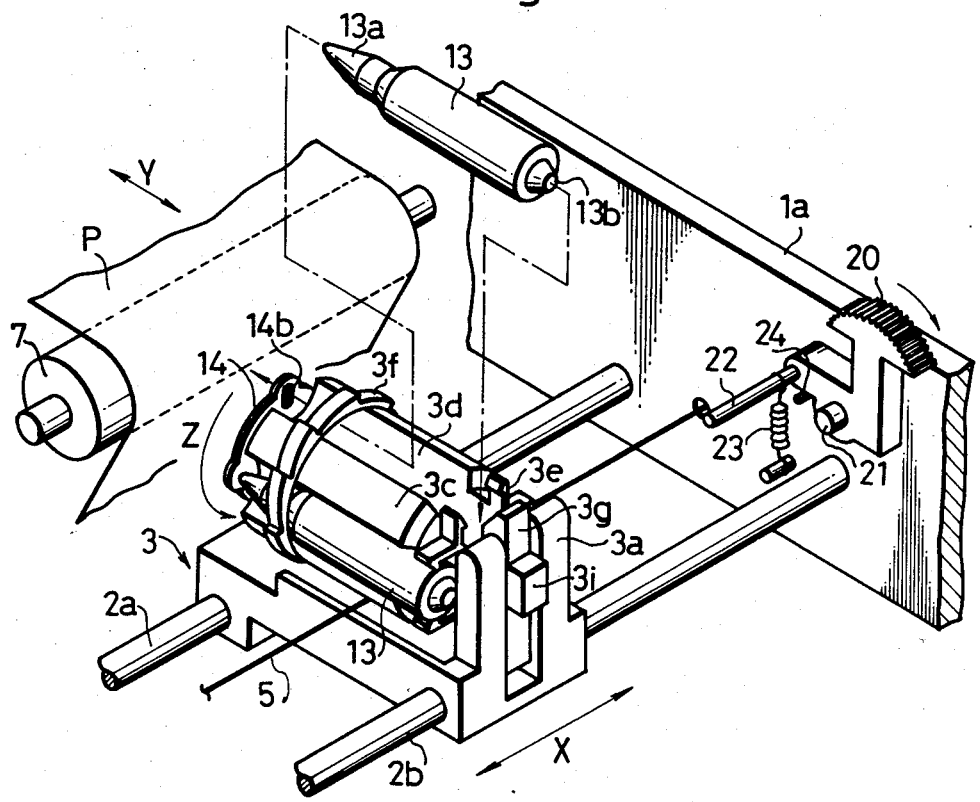
FIG. 2 is a perspective view showing the pen holder.

FIG. 1 illustrates the principle of a multicolor pen recorder in accordance with one embodiment of the present invention and FIG. 2 is a perspective view showing the principal mechanism of the recorder shown in FIG. 1.

In the drawings, reference numerals 1a and 1b represent side plates that are juxtaposed with each other with a predetermined gap between them. Two guide shafts 2a and 2b are spread between the side plates 1a and 1b and a pen holder 3 is fitted slidably in the direction indicated by X to the guide shafts 2a and 2b. Four pullies 4a, 4b, 4c and 4d are disposed outside both side plates 1a and 1b and a string 5 is spread between the pullies. The string 5 is wound on a driving pulley 6 of a pulse motor $M_1$ fitted to the main frame of the recorder and is fixed to the pen holder 3. The pen holder 3 slides in the X direction when the pulse motor $M_1$ rotates reversibly. A platen 7 is turnably fitted between both side plates 1a and 1b. A follower gear 8 is fixed to one of the ends of the platen 7. The driving gear 9 of a pulse motor $M_2$ fixed to the main frame of the recorder and this follower gear 8 are interconnected to each other via an intermediate gear (not shown). Support rollers 11a and 11b are disposed at both end portions of the platen 7 and come into pressure contact with the latter. The recording paper P is held in place by the platen 7 and the support rollers 11a and 11b. When the platen 7 is driven for rotation by the pulse motor $M_2$, the recording paper P is transferred in the direction represented by Y (FIG. 2).

Figure 3:
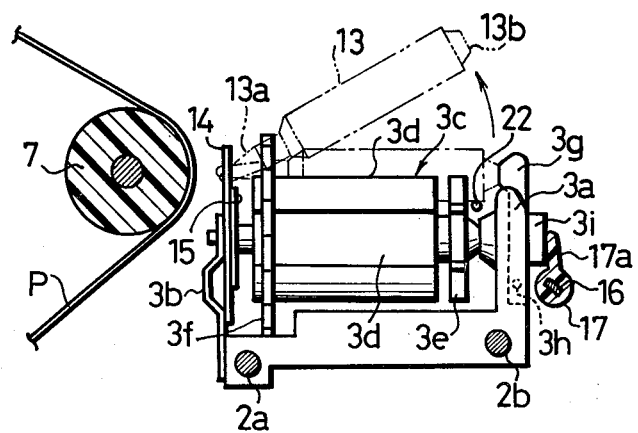
FIG. 3 is a left side view of the pen holder.

The pen holder 3 is molded from a resin. The front portion of the pen holder 3 is supported by the guide shaft 2a while the rear portion is supported by the guide shaft 2b, as depicted in FIGS. 2 and 3 (which is a left side view). A metallic support plate 3b is fixed at the front edge portion and pivotally supports a rotary member 3c in cooperation with a support wall 3a. Four support grooves 3d are defined around the rotary member 3c and support pawls 3e, that correspond to the support grooves 3d, respectively, are disposed at the rear part of the rotary member 3c. A gear ring 3f is disposed at the front edge portion of the rotary member 3c and teeth for rotating the rotary member 3c are formed around this gear ring 3f.

On the other hand, a protuberance 12 that engages with the teeth of the gear ring 3f is formed on the inner surface of the side plate 1b. A pen 13 is fitted to the four support grooves 3d. The pen 13 is a ball point pen of an oil or aqueous type. The four pens 13 to be fitted to the four support grooves 3d are black, red, blue and green, respectively. Each pen 13 has an increased diameter portion at which the pen 13 is supported by the respective support groove 3d and support pawl 3e. The pen tip 13a of each pen 13 is inserted into the gear ring 3f in such a fashion that the rear surface 13b of each pen 13 aligns with the inner surface of the support wall 3a.

Figure 6:
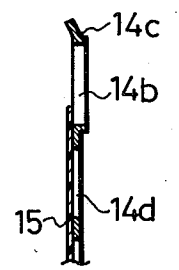
FIG. 6 is a sectional view taken along line VI—VI of FIG. 5.
Figure 5:
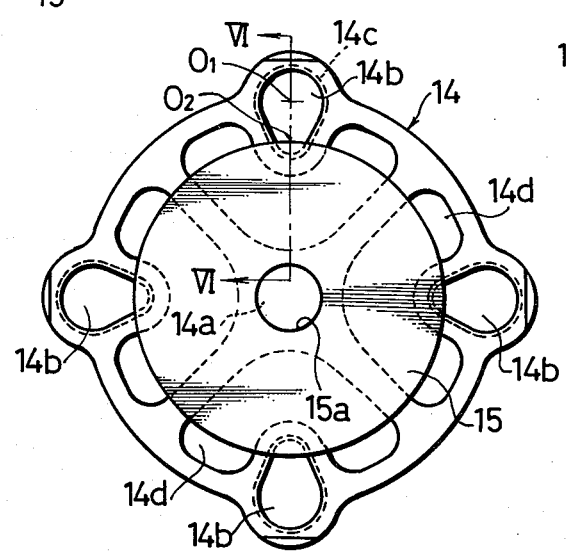
FIG. 5 is a plan view of the leaf spring and an auxiliary plate.

A leaf spring 14 and an auxiliary plate 15 are turnably fitted between the support plate 3b and the tip portion of the rotary member 3c. The leaf spring 14 is made of a thin resilient metal. As illustrated in FIGS. 5 (front view) and 6 (sectional view along line VI—VI), a fitting hole 14a is defined at the center of the leaf spring 14 with four support holes 14b at four positions around the center hole 14a. These support holes 14b support the pen tips 13a of the four pens 13. The fitting hole 14b has a shape such that a circle (center $O_1$) corresponding to the thickness of the pen tip 13a continues a small circle (center $O_2$) which is smaller than the former and is formed on the side of the fitting hole 14a. A flange 14c (a fine protuberance formed by barring; FIG. 6) projecting toward the platen 7 is formed around each support hole 14b. Four auxiliary holes 14d are bored on the leaf spring 14 so as to adjust the spring force. On the other hand, the auxiliary plate 15 is made of a synthetic resin sheet having both resiliency and rigidity such as Mylor, for example, and has a disc-like shape having a fitting hole 15a which has the same shape and diameter as those of the fitting holes 14a of the leaf spring 14. The combination of this auxiliary plate 15 with the leaf spring 14 makes uniform the spring force acting upon and around the four support holes 14b of the leaf spring 14 and also closes the auxiliary holes 14d of the leaf spring 14. On the other hand, a hammer 3g is fitted at the center of the support wall 3a formed at the rear portion of the pen holder 3 so that the hammer can rock with a support pin 3h being its support point. The upper end portion of this hammer 3h comes into contact with the rear end portion 13b of the pen 13 which is supported by the rotary member 3c and rotates up to the uppermost point.

A hammer shaft 16 having an oval-shaped cross-section is fitted between both side plates 1a and 1b in parallel with the guide shafts 2a and 2b. A holder 17 made of a resin is fixed around the hammer shaft 16 and a level 17a projecting from the holder 17 comes into contact with a rear protuberance 3i at the rear of the hammer 3g. As shown in FIG. 1, the level 17a is formed over the entire length of the moving range of the pen holder 3 in the X direction. A solenoid 18 is fitted outside the side plate 1a and the end portion of the hammer shaft 16 is interconnected to this solenoid 18 by a lever 19. A self-support type solenoid, which is stable in both operating directions, can be used as this solenoid 18.

A lever 20 for taking out the pen 13 from the rotary member 3c is turnably fitted to the inside of the side plate 1a with the pin 21 being the support point. A pin 22 is implanted to the lever 20 so that when the pen holder 3 moves to a position close to the side plate 1a, the pin 22 enters the lower part of the pen 13 which is situated at the uppermost position (see FIG. 3). Incidentally, a spring 23 is hooked on the pin 22 so as to urge in the downward direction and a stopper pin 24 restricts the rotation of the lever 20 in the urging direction.

Next, the action and effect of the pen recorder in accordance with the present invention will be described.

In the multi-color pen recorder of this embodiment, the black, red, blue and green pens 13 supported by the rotary member 3c on the pen holder 3 are alternately used so as to draw characters and drawings in multiple colors on the recording paper P. The pens 13 can be changed over in the following way. The pulse motor $M_1$ moves the pen holder 3 until it comes close to the side plate 1b. In this case, the protuberance 12 disposed inside the side plate 1b engages with the teeth of the gear ring 3f of the rotary member 3c and the moving force of the pen holder 3 toward the side plate 1b rotates the rotary member 3c in the Z direction (FIG. 2). Once the pen holder 3 comes close to the side plate 1b, the rotary member 3c rotates by a predetermined angle. Accordingly, the pen 13 having the desired color moves to the uppermost position when the pulse motor $M_1$ is controlled so that the pen holder 3 is brought close to and way from the side plate 1b in a predetermined number of times. Only the pen 13 thus moved to the uppermost position can be used for recording.

Since the tip 13a of each of the four pens 13 supported inside the support grooves 3d of the rotary member 3c is inserted into the support hole 14b of the leaf spring 14, each pen 13 does not move in the direction of the platen 7 and keeps a posture such that the rear end portion 13b of the pen keeps contact with the support wall 3a and with the upper portion of the hammer 3g (only for the uppermost pen 13).

Figure 4:
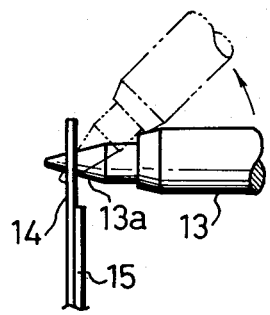
FIG. 4 is an enlarged view of the support portion of the pen tip.

Recording can be effected in the following way. The pulse motor $M_1$ first moves the pen holder 3 to a predetermined position in the X direction. Then, the solenoid 18 is actuated so as to rotate the hammer shaft 16 and the holder 17 which is unitary with the hammer shaft 16. When the portuberance 3i of the hammer 3g is pushed by the lever 17a, the pen 13 at the uppermost position moves in the direction of the platen 7 and its pen tip 13a comes into contact with the recording pater P. Signals are applied to both pulse motors $M_1$ and $M_2$ under this state to rotate them intermittently or continuously and reversibly, whereupon the pen 13 is moved in the X direction by the pen holder 3 while the recording paper P is sent in the Y direction with the rotation of the platen 7. Characters or drawings can be plotted on the recording paper P when the movement in the X and Y directions is controlled. Incidentally, the pen 13, that is pushed forward by the hammer 3g, is urged by the leaf spring 14 in the direction spaced apart from the platen 7. Accordingly, when the hammer shaft 16 rotates by the operation of the solenoid 18 and the lever 17a comes away from the protuberance 3i of the hammer 3g, the pen 13 moves back immediately and its pen tip 13a comes off from the recording paper P. When the ink inside the pen 13 is fully consumed or when the ink must be changed by the ink of a different color, the pen 13 can be taken out from the rotary member 3c and be again fitted thereto in the following way. First, the pen holder 3 is moved to a position close to the side plate 1a by operating the pulse motor $M_1$. In this case, the pin 22 implanted to the lever 20 comes below the pen 13 situated at the uppermost position (see FIG. 3). Under this state, when the lever 20 is rotated in the direction represented by the arrow in FIG. 2, the pen 13 is pushed upward by the pin 22 and comes off from inside the support groove 3d. In this case, the pen 13 rotates upward with its tip 13a being the support point, as shown in FIG. 4 so that the pen tip 13a rotates inside the support hole 14b of the leaf spring 14. Since the support hole 4b has the hole of the reduced diameter (center $0_2$) continuing in the central direction of the leaf spring 14 in addition to the hole (center $0_1$) corresponding to the diameter of the pen 13a, as shown in FIG. 5, however, the pen tip 13a can escape into the hole of the reduced diameter (center $0_2$) when the pen 13 is pulled out, without being caught by the support hole 14b.

Furthermore, since the flange 14c is formed around the support hole 14b so as to provide sufficient strength as shown in FIG. 6, the peripheral portion of the support hole 14b is neither damaged by the pen tip 13a nor undergoes deformation. When a new pen 13 is fitted into the fitting groove 13d, the pen tip 13a is first inserted into the gear ring 3f and then into the support hole 14b of the leaf spring 14 and the rear portion of the pen 13 is thereafter held in place by the support pawls 3e. Since the auxiliary holes 14d other than the support holes 14b formed on the leaf spring 14 are closed by the auxiliary plate 15, the pen tip 13a does not accidentally come into the auxiliary holes 14d but can be reliably inserted into the support hole 14b. Since the auxiliary plate 15 assists the leaf spring 14 from the side of the rotary member 3c, the leaf spring 14 does not undergo deformation even if bending force acts accidentally upon the leaf spring 14 so as to bend it towards the rotary member 3c.

Though the foregoing embodiment illustrates the multi-color pen recorder, the present invention can also be applied to the pen holder for holding a pen of a single color. As described in the foregoing, in pen recorders of the type in which the pen or pens can be removed from the pen holder, the present invention expands the support holes of the leaf spring supporting the pen tip in the direction opposite the pen removing direction so that the pen or pens can be smoothly removed without being caught inside the support holes. Moreover, since the support holes of the leaf spring do not undergo deformation by the pen tip, the durability of the leaf spring can be improved.

What is claimed is:

1. In a pen recorder for obtaining desired recording data by pushing pen means mounted to a pen holder onto recording paper, the improvement comprising:
   (a) a feed mechanism for feeding said recording paper;
   (b) a moving pen holder for supporting said pen means; and
   (c) hammer means disposed at the rear of said pen means so as to bring the tip of said pen means into contact with said recording paper;
   (d) the tip of said pen means being fitted into support holes bored on a leaf spring fixed to said pen holder;
   (e) said leaf spring urging said pen means toward said hammer means;
   (f) said pen means being detachable relative to said pen holder;

(g) said support hole of said leaf spring being shaped by expanding a part of a round hole in the direction opposite the pen withdrawing direction.

2. The pen recorder as defined in claim 1 wherein said pen holder includes a plurality of said pen means and each of said pen means is urged by said leaf spring toward said hammer means.

3. The pen recorder as defined in claim 2 wherein said leaf spring has a plurality of support holes for inserting the tip of said pen means thereinto and said support holes are formed on a circumference.

4. The pen recorder as defined in claim 2 wherein said pen holder has a rotary member, a plurality of support grooves are defined around said rotary member and support pawls are formed on said rotary member so as to correspond to said support grooves, respectively.

5. The pen recorder as defined in claim 3 wherein auxiliary holes are defined between adjacent support holes of said plurality of support holes bored on said leaf spring.

6. The pen recorder as defined in claim 1 wherein an auxiliary plate is placed upon said leaf spring.

7. The pen recorder as defined in claim 6 wherein said leaf spring is made of a thin resilient metallic material and said auxiliary plate is made of a thin synthetic resin plate.

8. The pen recorder as defined in claim 4 wherein a gear ring having teeth for rotating said rotary member is formed at the front edge portion of said rotary member.

* * * * *